United States Patent
Petrov

(10) Patent No.: US 8,750,633 B2
(45) Date of Patent: Jun. 10, 2014

(54) METHODS AND SYSTEMS FOR APPROXIMATING PROGRESSIVE IMAGE ENCODING USING IMAGE PARTITIONING

(71) Applicant: Citrix Systems, Inc., Fort Lauderdale, FL (US)

(72) Inventor: Julian Petrov, Pembroke Pines, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 14/016,560

(22) Filed: Sep. 3, 2013

(65) Prior Publication Data

US 2014/0003733 A1 Jan. 2, 2014

Related U.S. Application Data

(63) Continuation of application No. 12/728,740, filed on Mar. 22, 2010, now Pat. No. 8,559,733.

(60) Provisional application No. 61/165,231, filed on Mar. 31, 2009.

(51) Int. Cl.
*G06K 9/36* (2006.01)
*G06K 9/32* (2006.01)

(52) U.S. Cl.
USPC .......................................... 382/232; 382/300

(58) Field of Classification Search
CPC .................... H04N 19/00278; H04N 13/0048; H04N 19/00521; H04N 19/00757; H04N 19/00272; H04N 19/00072; H04N 19/00224; H04N 19/00424; H04N 19/00472; H04N 13/0438; G03F 4/70475; G09G 2310/0229; G06T 3/4053; G06T 3/403; G06T 2207/20021; G06T 3/4007; G06T 5/00; G06T 9/00; G06K 9/36
See application file for complete search history.

(56) References Cited

U.S. PATENT DOCUMENTS 3,993,861 A * 11/1976 Baer .............................. 348/473
4,161,753 A * 7/1979 Bailey et al. .................. 386/271
(Continued)

FOREIGN PATENT DOCUMENTS

WO WO-01/80561 10/2001

OTHER PUBLICATIONS

David S Taubman et al: "JPEG2000: Standard for Interactive Imaging" Proceedings of the IEEE, IEEE. New York, US, vol. 90, No. 8, Aug. 1, 2002 XP011065053 ISSN: 0018-9219 p. 1352, left-hand column, line 11 line 17 p. 1350; figure 17 p. 1347, right-hand column, paragraph IV.A.—p. 1348, left-hand column, p. 1340, right-hand column—p. 1343, left-hand column; figure 8 p. 1349, right-hand column—p. 1350, right-hand column p. 1349, left-hand column, line 5 013 line.

(Continued)

*Primary Examiner* — Manav Seth
(74) *Attorney, Agent, or Firm* — Foley and Lardner LLP; John D. Lanza

(57) ABSTRACT

An image partitioner that executes on a local computer to vertically partition pixels of an original image into one or more non-overlapping vertical rows of image pixels, and horizontally partition the original image pixels into one or more non-overlapping horizontal rows of image pixels. The image partitioner can then separate the original image into a first sub-image that includes pixels of a first horizontal row and pixels of a first vertical row. The image partitioner can then separate the original image into a second sub-image that includes pixels of either the first horizontal row and a second vertical row, or a second horizontal row and the first vertical row. The first sub-image and second sub-image are then transmitted to a remote computer that interlaces the first sub-image with the second sub-image to create a first combined image which approximates the original image on the local computer.

20 Claims, 8 Drawing Sheets

(56) References Cited

U.S. PATENT DOCUMENTS

| | | | | |
|---|---|---|---|---|
| 4,941,045 | A * | 7/1990 | Birch | 348/448 |
| 4,987,480 | A * | 1/1991 | Lippman et al. | 348/396.1 |
| 5,007,102 | A * | 4/1991 | Haskell | 382/238 |
| 5,054,094 | A * | 10/1991 | Barski | 382/192 |
| 5,223,926 | A * | 6/1993 | Stone et al. | 375/240.01 |
| 5,274,753 | A * | 12/1993 | Roskowski et al. | 345/546 |
| 5,293,434 | A * | 3/1994 | Feig et al. | 382/234 |
| 5,333,212 | A * | 7/1994 | Ligtenberg | 382/250 |
| 5,442,399 | A * | 8/1995 | Asamura et al. | 375/240.01 |
| 5,444,800 | A * | 8/1995 | Kim | 382/239 |
| 5,502,576 | A * | 3/1996 | Ramsay et al. | 358/444 |
| 5,504,530 | A * | 4/1996 | Obikane et al. | 375/240.14 |
| 5,510,838 | A * | 4/1996 | Yomdin et al. | 348/384.1 |
| 5,568,278 | A * | 10/1996 | Nakano et al. | 382/248 |
| 5,898,414 | A * | 4/1999 | Awamoto et al. | 345/55 |
| 6,297,845 | B1 * | 10/2001 | Kuhn et al. | 348/192 |
| 6,587,588 | B1 * | 7/2003 | Bottou et al. | 382/240 |
| 6,690,728 | B1 * | 2/2004 | Chang et al. | 375/240.16 |
| 6,724,944 | B1 * | 4/2004 | Kalevo et al. | 382/268 |
| 6,731,818 | B1 * | 5/2004 | Conklin | 382/254 |
| 6,928,191 | B2 * | 8/2005 | Goertzen | 382/240 |
| 6,980,596 | B2 * | 12/2005 | Wang et al. | 375/240.16 |
| 7,376,279 | B2 * | 5/2008 | Dekel et al. | 382/240 |
| 7,418,142 | B2 * | 8/2008 | Zandi et al. | 382/232 |
| 7,746,857 | B2 * | 6/2010 | Mizoguchi et al. | 370/389 |
| 7,756,345 | B2 * | 7/2010 | Shiiyama | 382/232 |
| 7,881,541 | B2 * | 2/2011 | Kashima et al. | 382/232 |
| 7,885,334 | B2 * | 2/2011 | Muller et al. | 375/240.24 |
| 8,111,749 | B2 * | 2/2012 | Muller et al. | 375/240.1 |
| 8,131,095 | B2 * | 3/2012 | Larrieu et al. | 382/239 |
| 8,565,298 | B2 * | 10/2013 | Schwartz | 375/240 |
| 2001/0017944 | A1 * | 8/2001 | Kalevo et al. | 382/268 |
| 2002/0001346 | A1 * | 1/2002 | Kato et al. | 375/240.16 |
| 2004/0032968 | A1 | 2/2004 | Andrew et al. | |
| 2004/0201717 | A1 * | 10/2004 | Matsushima | 348/222.1 |
| 2006/0093042 | A1 * | 5/2006 | Kashima et al. | 375/240.24 |
| 2006/0093043 | A1 * | 5/2006 | Kashima et al. | 375/240.24 |
| 2006/0110065 | A1 * | 5/2006 | Huang et al. | 382/275 |
| 2007/0076961 | A1 * | 4/2007 | Shiiyama | 382/232 |
| 2008/0002911 | A1 * | 1/2008 | Eisen et al. | 382/283 |
| 2008/0107040 | A1 * | 5/2008 | Mizoguchi et al. | 370/252 |
| 2008/0240587 | A1 * | 10/2008 | Au et al. | 382/236 |
| 2011/0102443 | A1 | 5/2011 | Dror et al. | |

OTHER PUBLICATIONS

European Examination Report on 10712638.5 dated Oct. 4, 2012.
International Preliminary Report on Patentability on PCT/US2010/029359 dated Oct. 13, 2011.
International Search Report on PCT/US2010/029359 dated Aug. 12, 2010.
Nein-Hsien Lin et al: "3D Model Streaming Based on JPEG 2000" IEEE Transactions on Consumer Electronics, IEEE Service Center, New York, NY, US LNKD-DOI:10.1109/TCE.2007.339523, vol. 53, No. 1, Feb. 1, 2007, pp. 182-190, XP011175941 ISSN: 0098-3063 * abstract p. 184, left-hand column—p. 185, left-hand column, paragraphs III.A., III.B.,III.C. page 185, left-hand column—p. 186, left-hand column; figure 4 p. 183, right-hand column—p. 184, left-hand column; figure I.
Notice of Allowance on U.S. Appl. No. 12/728,740 dated Jun. 3, 2013.
Office Action on U.S. Appl. No. 12/728,740 dated Mar. 14, 2013.
Written Opinion on PCT/US2010/029359 dated Aug. 12, 2010.

* cited by examiner

METHODS AND SYSTEMS FOR APPROXIMATING PROGRESSIVE IMAGE ENCODING USING IMAGE PARTITIONING

RELATED APPLICATIONS

This U.S. Patent Application claims priority to U.S. patent application Ser. No. 12/728,740, now allowed, which claims priority to U.S. Provisional Patent Application Ser. No. 61/165,231, filed on Mar. 31, 2009, the disclosure of which is considered part of the disclosure of this application and is herein incorporated by reference in its entirety.

FIELD OF THE DISCLOSURE

This invention relates generally to encoding and transmitting images. More specifically, this invention relates to partitioning and encoding images to approximate progressive image encoding.

BACKGROUND OF THE DISCLOSURE

Transmitting three-dimensional, or even in some cases two-dimensional graphics, can be a resource intensive process. In some instances, the image may include complex textures, shading or other attributes thereby causing the image to be relatively large and therefore require a large amount of resources to transfer the image from one computer to another. These systems often do not have the resources required to accommodate low bandwidth requirements and time constraints that may be placed on the transfer process of an image from one machine to another.

Many methods and techniques exist to compress and encode graphics to alleviate the strain graphics processing places on systems and networks. One such method is progressive image encoding which encodes portions of an image, transmits those encoded portions to a remote machine, and decodes each image portion as it is received. A downside to progressive image encoding is that it can place a significant strain on the CPU because each intermediary encode/decode step requires a great deal of resources. The high CPU cost is due to the fact that the entire image must be entirely decoded at each intermediary step. Thus, each step in the decoding process fails to take advantage of the decoding performed by earlier steps in the decoding process. Were a user to have a slow network connection, then progressive encoding would be useful because it would allow the user to see the image encode over a period of time.

There are a number of different encoding standards that support progressive encoding, such as JPEG and JPEG XR. Like progressive encoding, there are drawbacks to both of these encoding standards. While JPEG XR offers high quality compression, a great deal of time is required to encode and decode using this technique, and the technique requires a high powered CPU both on the local computing machine and the remote computing machine. While the quality of JPEG XR compression is much higher than traditional JPEG, in situations where speed and scalability are required, traditional JPEG may be a better choice.

Remote desktop and application delivery can in many instances require fast delivery of images in many different environments. Thus, a progressive-image-encoding-like solution is needed that takes advantage of encoding techniques more suited to the needs of a remote desktop and application delivery system. Current systems have approximated such a system by encoding images once using JPEG at low quality setting, and then encoding the same image again at high quality setting. The first image is sent to a remote client, and after a period of delay, the second image is sent to the client. The drawback of this technique is that the display of a fuzzy image followed by a clear image may not be pleasing to the eye.

Thus, methods and systems are needed that can approximate progressive image encoding using a reliable method that can generate images that are pleasing to the eye. Further, it would be advantageous for these systems to utilize an encoding technique suited to the needs of a remote desktop and application delivery system.

SUMMARY OF THE DISCLOSURE

In its broadest interpretation, this disclosure describes methods and systems for approximating progressive image encoding using a technique that takes advantage of image partitioning and interpolation of image portions to approximate the results of progressive image encoding. The methods and systems described herein, unlike typical progressive image encoding or other encoding techniques, requires significantly less computation resources and network bandwidth.

In one aspect, described herein is an embodiment of a method for approximating progressive image encoding of streamed images. An image partitioner executing on a local computer vertically partitions pixels of an original image into one or more non-overlapping vertical rows of image pixels. The image partitioner also horizontally partitions the original image pixels into one or more non-overlapping horizontal rows of image pixels. The image partitioner then separates the original image into a first sub-image that includes pixels of a first horizontal row and pixels of a first vertical row, and a second sub-image that includes pixels of either the first horizontal row and a second vertical row, or a second horizontal row and the first vertical row. A remote computer receives the first sub-image and the second sub-image transmitted to the remote computer by the local computer. The remote computer then interlaces the first sub-image with the second sub-image to create a first combined image that approximates the original image.

In one embodiment, the image partitioner, after the local machine transmits the first sub-image and the second sub-image to the remote computer, separates the original image into a third sub-image that includes pixels of either the first horizontal row and the second vertical row, or the second horizontal row and the first vertical row. The remote computer then receives the third sub-image transmitted by the local computer to the remote computer. The remote computer, in some embodiments, interlaces the first combined image with the third sub-image to create a second combined image that approximates the original image.

In another embodiment, the remote computer receives the first sub-image and the second sub-image which are streamed from the local computer to the remote computer.

The image partitioner, in some embodiments, obtains a field value. Obtaining the field value, in some embodiments, includes obtaining a predetermined number of vertical columns and a predetermined number of horizontal rows. In some embodiments, the image partitioner separates the original image into the first sub-image and the second sub-image according to the obtained field value.

In some embodiments, before the first sub-image and the second sub-image are transmitted to the remote computer, each sub-image is encoded by the local computer.

In other embodiments, before the first sub-image and the second sub-image are interlaced, each sub-image is decoded by the remote computer.

The remote computer, in some embodiments, interpolates pixels of the original image not included in the first sub-image and the second sub-image. The remote computer then uses the interlaced first sub-image and second sub-image and the interpolated pixels to create the first combined image.

In other aspects, described herein is a system for approximating progressive image encoding of streamed images. In one embodiment, the system includes an image partitioner executing on a local computer. The image partitioner vertically partitions pixels of an original image into one or more non-overlapping vertical rows of image pixels. The image partitioner then horizontally partitions the original image pixels into one or more non-overlapping horizontal rows of image pixels. The image partitioner then separates the original image into a first sub-image that includes pixels of a first horizontal row and pixels of a first vertical row, and a second sub-image that includes pixels of either the first horizontal row and a second vertical row, or a second horizontal row and the first vertical row. The system can also include a remote computer that receives the first sub-image and the second sub-image from the local computer, and interlaces the first sub-image with the second sub-image to create a first combined image that approximates the original image.

DETAILED DESCRIPTION OF THE DRAWINGS

The following figures depict certain illustrative embodiments of the methods and systems described herein, where like reference numerals refer to like elements. Each depicted embodiment is illustrative of the methods and systems and not limiting.

FIGS. 5A-5D are block diagrams illustrative of an embodiment of images that have been combined from image partitions.

DETAILED DESCRIPTION

Figure 1A:
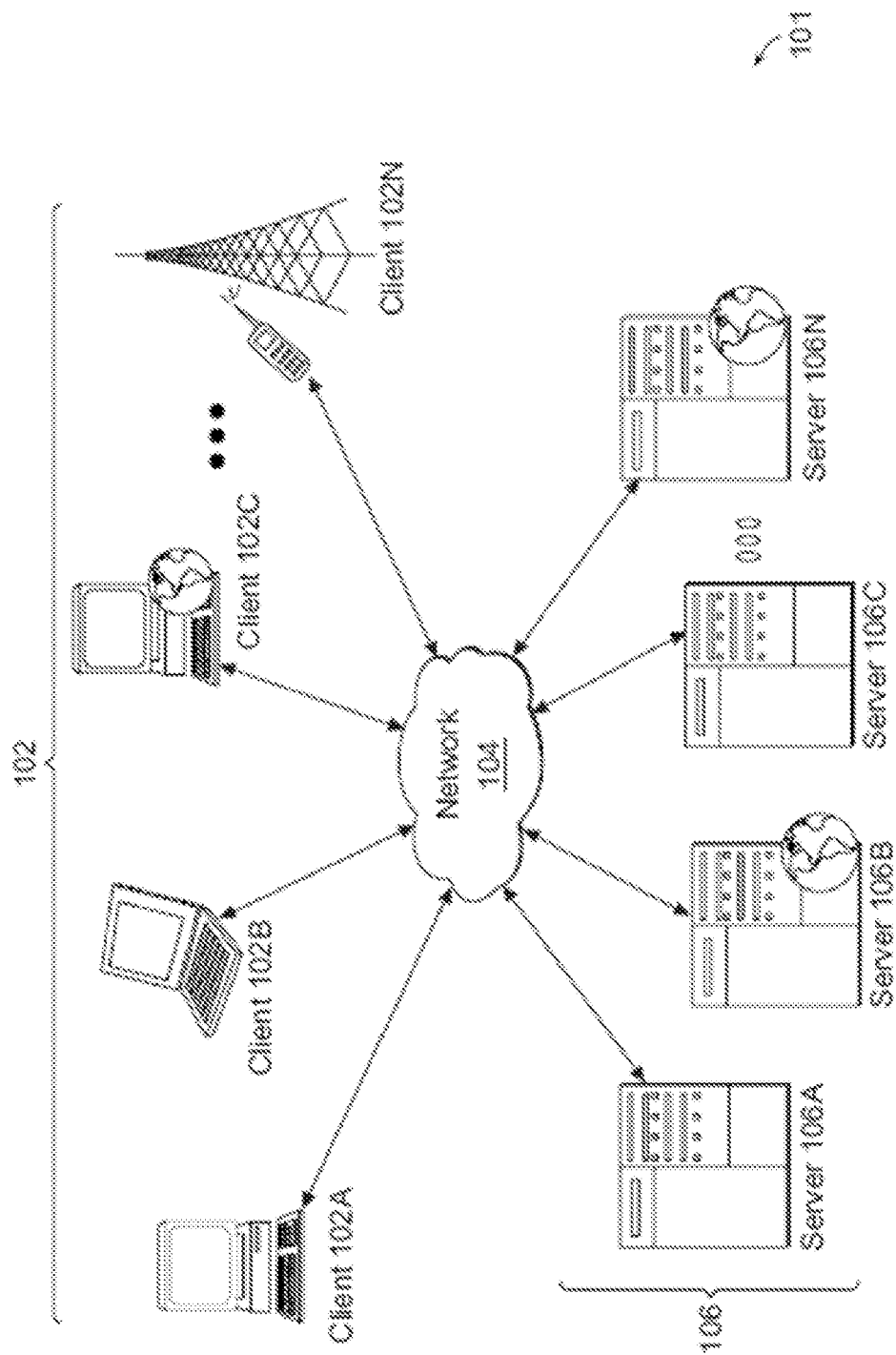
FIG. 1A is a block diagram illustrative of an embodiment of a remote-access, networked environment with a client machine that communicates with a server.

FIG. 1A illustrates one embodiment of a computing environment 101 that includes one or more client machines 102A-102N (generally referred to herein as "client machine(s) 102") that are in communication with one or more servers 106A-106N (generally referred to herein as "server(s) 106"). Installed in between the client machine(s) 102 and server(s) 106 is a network.

In one embodiment, the computing environment 101 can include an appliance installed between the server(s) 106 and client machine(s) 102. This appliance can mange client/server connections, and in some cases can load balance client connections amongst a plurality of backend servers.

The client machine(s) 102 can in some embodiment be referred to as a single client machine 102 or a single group of client machines 102, while server(s) 106 may be referred to as a single server 106 or a single group of servers 106. In one embodiment a single client machine 102 communicates with more than one server 106, while in another embodiment a single server 106 communicates with more than one client machine 102. In yet another embodiment, a single client machine 102 communicates with a single server 106.

A client machine 102 can, in some embodiments, be referenced by any one of the following terms: client machine(s) 102; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

In one embodiment, the client machine 102 can be a virtual machine 102C. The virtual machine 102C can be any virtual machine, while in some embodiments the virtual machine 102C can be any virtual machine managed by a hypervisor developed by XenSolutions, Citrix Systems, IBM, VMware, or any other hypervisor. In other embodiments, the virtual machine 102C can be managed by any hypervisor, while in still other embodiments, the virtual machine 102C can be managed by a hypervisor executing on a server 106 or a hypervisor executing on a client 102.

The client machine 102 can in some embodiments execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 102 that displays application output generated by an application remotely executing on a server 106 or other remotely located machine. In these embodiments, the client device 102 can display the application output in an application window, a browser, or other output window. In one embodiment, the application is a desktop, while in other embodiments the application is an application that generates a desktop.

The server 106, in some embodiments, executes a remote presentation client or other client or program that uses a thin-client or remote-display protocol to capture display output generated by an application executing on a server 106 and transmits the application display output to a remote client 102. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment can include more than one server 106A-106N such that the servers 106A-106N are logically grouped together into a server farm 106. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. In embodiments where the server 106 comprises an appliance, the server 106 can be an appliance manufactured by any one of the following manufacturers: the Citrix Application Networking Group; Silver Peak Systems, Inc; Riverbed Technology, Inc.; F5 Networks, Inc.; or Juniper Networks, Inc. Some embodiments include a first server 106A that receives requests from a client machine 102, forwards the request to a second server 106B, and responds to the request generated by the client machine 102 with a response from the second server 106B. The first server 106A can acquire an enumeration of applications available to the client machine 102 and well as address information associated with an application server 106 hosting an application identified within the enumeration of applications. The first server 106A can then present a response to the client's request using a web interface, and communicate directly with the client 102 to provide the client 102 with access to an identified application.

The server 106 can, in some embodiments, execute any one of the following applications: a thin-client application using a thin-client protocol to transmit application display data to a client; a remote display presentation application; any portion of the CITRIX ACCESS SUITE by Citrix Systems, Inc. like the METAFRAME or CITRIX PRESENTATION SERVER; MICROSOFT WINDOWS Terminal Services manufactured by the Microsoft Corporation; or an ICA client, developed by Citrix Systems, Inc. Another embodiment includes a server 106 that is an application server such as: an email server that provides email services such as MICROSOFT EXCHANGE manufactured by the Microsoft Corporation; a web or Internet server; a desktop sharing server; a collaboration server; or any other type of application server. Still other embodiments include a server 106 that executes any one of the following types of hosted servers applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 102 can, in some embodiments, be a client node that seeks access to resources provided by a server 106. In other embodiments, the server 106 may provide clients 102 or client nodes with access to hosted resources. The server 106, in some embodiments, functions as a master node such that it communicates with one or more clients 102 or servers 106. In some embodiments, the master node can identify and provide address information associated with a server 106 hosting a requested application, to one or more clients 102 or servers 106. In still other embodiments, the master node can be a server farm 106, a client 102, a cluster of client nodes 102, or an appliance.

One or more clients 102 and/or one or more servers 106 can transmit data over a network 104 installed between machines and appliances within the computing environment 101. The network 104 can comprise one or more sub-networks, and can be installed between any combination of the clients 102, servers 106, computing machines and appliances included within the computing environment 101. In some embodiments, the network 104 can be: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; or a primary private network 104 with a private sub-network 104. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network 104 that includes a wireless link where the wireless link can be an infrared channel or satellite band. The network topology of the network 104 can differ within different embodiments, possible network topologies include: a bus network topology; a star network topology; a ring network topology; a repeater-based network topology; or a tiered-star network topology. Additional embodiments may include a network 104 of mobile telephone networks that use a protocol to communicate among mobile devices, where the protocol can be any one of the following: AMPS; TDMA; CDMA; GSM; GPRS UMTS; or any other protocol able to transmit data among mobile devices.

Figure 1B:
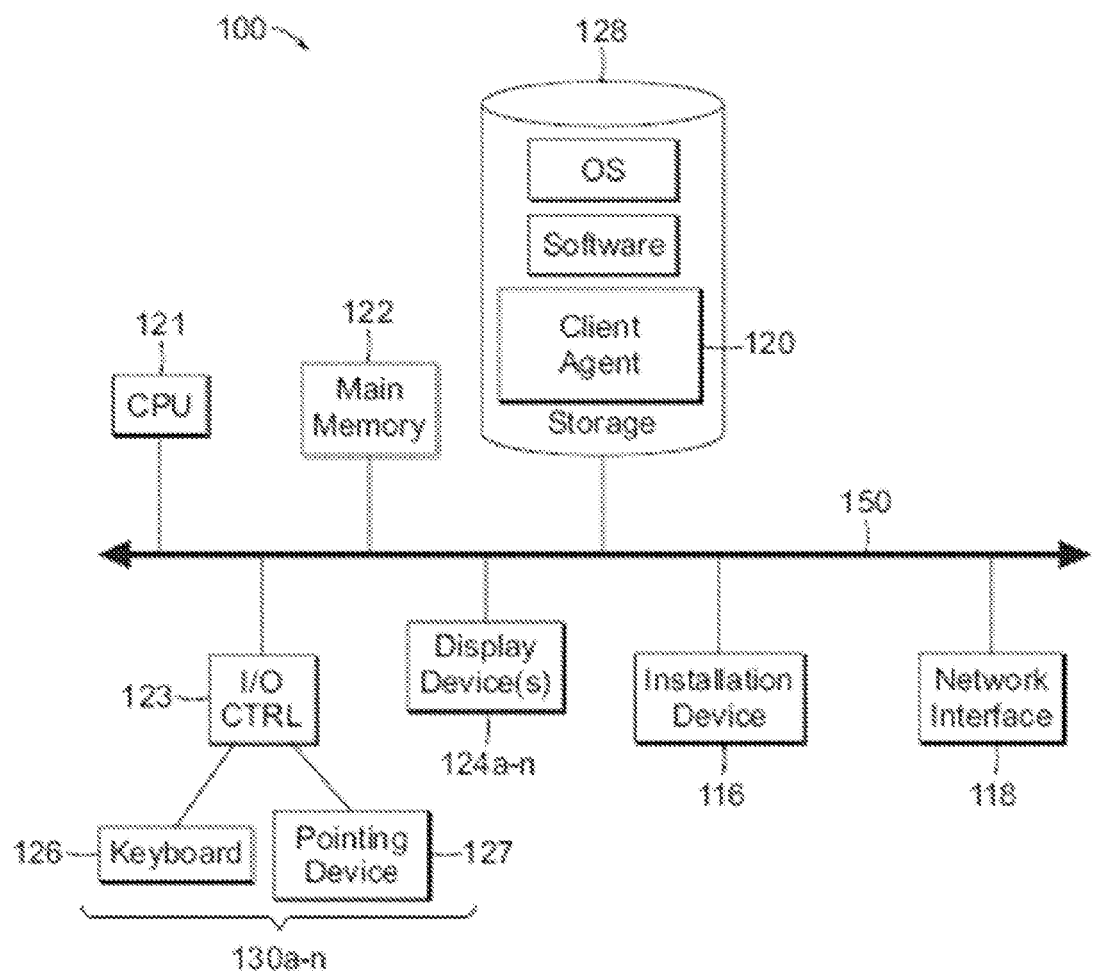
FIGS. 1B and 1C are block diagrams illustrative of an embodiment of computing machines for practicing the methods and systems described herein.

Illustrated in FIG. 1B is an embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and a client agent 120. The I/O controller 123, in some embodiments, is further connected to a key board 126, and a pointing device 127. Other embodiments may include an I/O controller 123 connected to more than one input/output device 130A-130N.

Figure 1C:
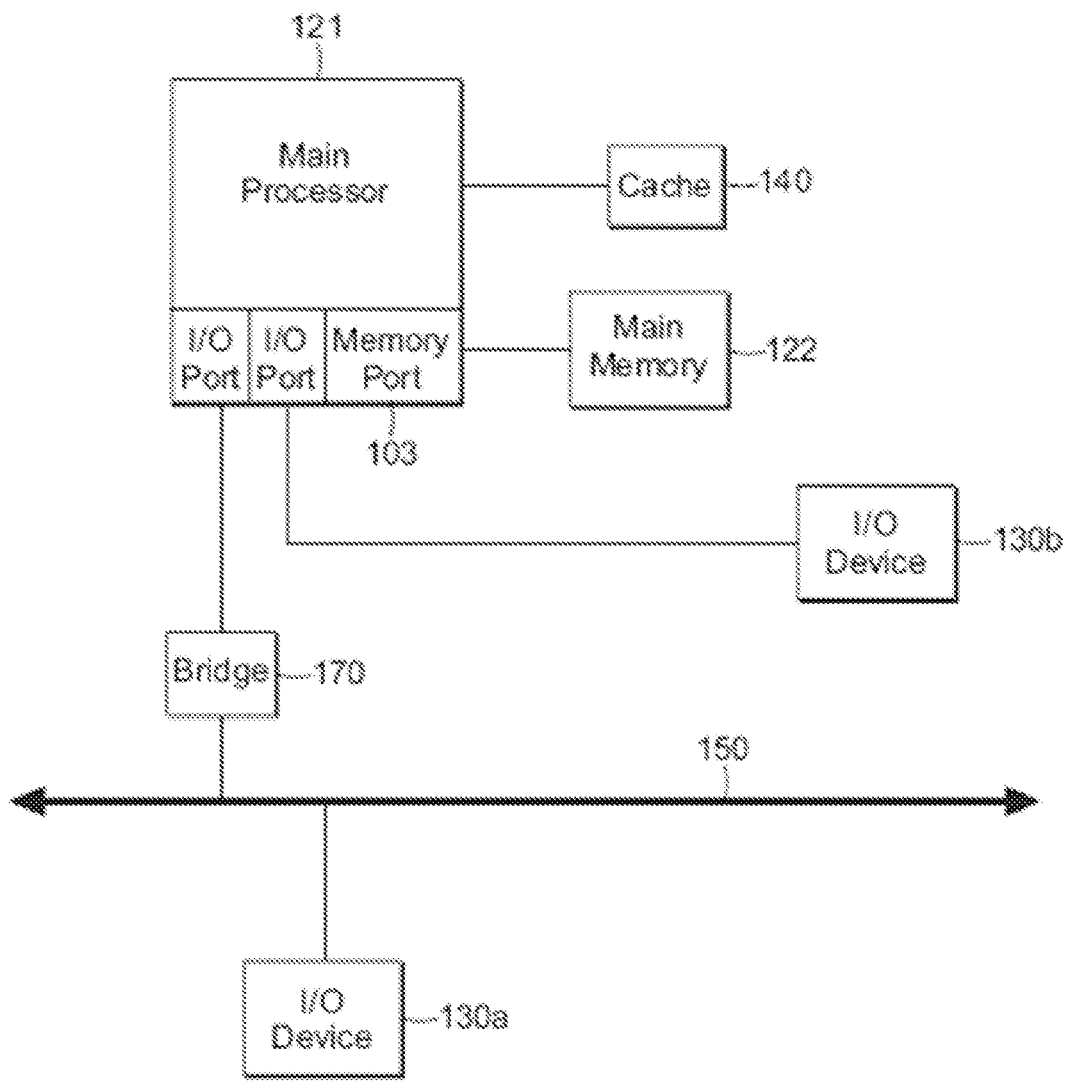

FIG. 1C illustrates one embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the main central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 122 may include any combination of the following: a microprocessor, a microcontroller, a central processing unit with a single processing core, a central processing unit with two processing cores, or a central processing unit with more than one processing core.

While FIG. 1C illustrates a computing device 100 that includes a single central processing unit 121, in some embodiments the computing device 100 can include one or more processing units 121. In these embodiments, the computing device 100 may store and execute firmware or other executable instructions that, when executed, direct the one or more processing units 121 to simultaneously execute instructions or to simultaneously execute instructions on a single piece of data. In other embodiments, the computing device 100 may store and execute firmware or other executable instructions that, when executed, direct the one or more processing units to each execute a section of a group of instructions. For example, each processing unit 121 may be instructed to execute a portion of a program or a particular module within a program.

In some embodiments, the processing unit 121 can include one or more processing cores. For example, the processing unit 121 may have two cores, four cores, eight cores, etc. In one embodiment, the processing unit 121 may comprise one or more parallel processing cores. The processing cores of the processing unit 121, may in some embodiments access available memory as a global address space, or in other embodiments, memory within the computing device 100 can be segmented and assigned to a particular core within the processing unit 121. In one embodiment, the one or more processing cores or processors in the computing device 100 can each access local memory. In still another embodiment, memory within the computing device 100 can be shared amongst one or more processors or processing cores, while other memory can be accessed by particular processors or subsets of processors. In embodiments where the computing device 100 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 100 includes one or more processing units 121, or a processing unit 121 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 100, in some embodiments, can include a graphics processor or a graphics processing unit (Not Shown). The graphics processing unit can include any combination of software and hardware, and can further input graphics data and graphics instructions, render a graphic from the inputted data and instructions, and output the rendered graphic. In some embodiments, the graphics processing unit can be included within the processing unit 121. In other embodiments, the computing device 100 can include one or more processing units 121, where at least one processing unit 121 is dedicated to processing and rendering graphics.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O device 130A-130N. In some embodiments, the local system bus 150 can be any one of the following types of buses: a VESA VL bus; an ISA bus; an EISA bus; a Micro-Channel Architecture (MCA) bus; a PCI bus; a PCT-X bus; a PCI-Express bus; or a NuBus. Other embodiments of the computing machine 100 include an I/O device 130A-130N that is a video display 124 that communicates with the central processing unit 121. Still other versions of the computing machine 100 include a processor 121 connected to an I/O device 130A-130N via any one of the following connections: HyperTransport, Rapid I/O, or InfiniBand. Further embodiments of the computing machine 100 include a processor 121 that communicates with one I/O device 130A using a local interconnect bus and a second I/O device 130B using a direct connection.

The computing device 100, in some embodiments, includes a main memory unit 122 and cache memory 140. The cache memory 140 can be any memory type, and in some embodiments can be any one of the following types of memory: SRAM; BSRAM; or EDRAM. Other embodiments include cache memory 140 and a main memory unit 122 that can be any one of the following types of memory: Static random access memory (SRAM), Burst SRAM or Synch-Burst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 121 that can access the main memory 122 via: a system bus 150; a memory port 103; or any other connection, bus or port that allows the processor 121 to access memory 122.

One embodiment of the computing device 100 provides support for any one of the following installation devices 116: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 120, or any portion of a client agent 120. The computing device 100 may further include a storage device 128 that can be either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

The computing device 100 may further include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments include an I/O device 130 that may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 100 can connect to multiple display devices 124A-124N, in other embodiments the computing device 100 can connect to a single display device 124, while in still other embodiments the computing device 100 connects to display devices 124A-124N that are the same type or form of display, or to display devices that are different types or forms. Embodiments of the display devices 124A-124N can be supported and enabled by the following: one or multiple I/O devices 130A-130N; the I/O controller 123; a combination of I/O device(s) 130A-130N and the I/O controller 123; any combination of hardware and software able to support a display device 124A-124N; any type and/or form of video adapter, video card, driver, and/or library to interface, communicate, connect or otherwise use the display devices 124A-124N. The computing device 100 may in some embodiments be configured to use one or multiple display devices 124A-124N, these configurations include: having multiple connectors to interface to multiple display devices 124A-124N; having multiple video adapters, with each video adapter connected to one or more of the display devices 124A-124N; having an operating system configured to support multiple displays 124A-124N; using circuits and software included within the computing device 100 to connect to and use multiple display devices 124A-124N; and executing software on the main computing device 100 and multiple secondary computing devices to enable the main computing device 100 to use a secondary computing device's display as a display device 124A-124N for the main computing device 100. Still other embodiments of the computing device 100 may include multiple display devices 124A-124N provided by multiple secondary computing devices and connected to the main computing device 100 via a network.

In some embodiments, the computing machine 100 can execute any operating system, while in other embodiments the computing machine 100 can execute any of the following operating systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system. In still another embodiment, the computing machine 100 can execute multiple operating systems. For example, the computing machine 100 can execute PARALLELS or another virtualization platform that can execute or manage a virtual machine executing a first operating system, while the computing machine 100 executes a second operating system different from the first operating system.

The computing machine 100 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95c1, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. In still other embodiments, the computing device 100 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; or any other handheld mobile device.

Figure 2:
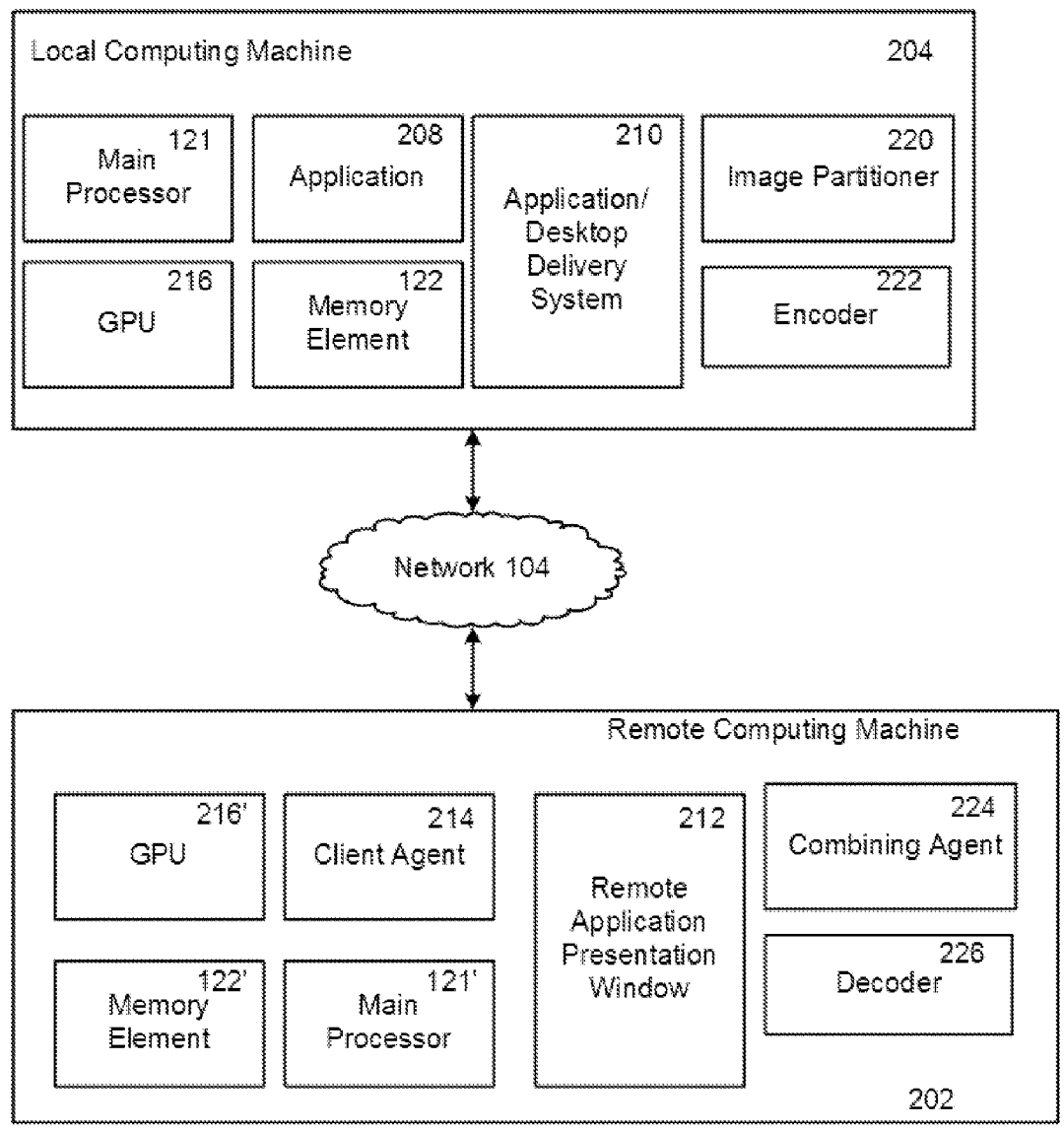
FIG. 2 is a block diagram illustrative of an embodiment of a system for accomplishing progressive-image-scanning-like image encoding.

Illustrated in FIG. 2 is an embodiment of a system that encodes image data by approximating progressive image encoding. The system can include a local computing machine 204 and a remote computing machine 202, where each computer can include any of the following hardware or software elements: a main processor 121, 121'; a graphical processing unit 216, 216'; and a memory element or repository 122, 122'. In some embodiments, the local computing machine 204 can execute one or more applications 208, an application or desktop delivery system 210, an image partitioner 220 and an encoder 222. In other embodiments, the remote computing machine 202 can execute a client agent 214, a remote application presentation window 212, a combining agent 224 and a decoder 226. The local machine 204, in some embodiments, can communicate with the remote machine 202 over a network 104.

Referring to FIG. 2, and in more detail, in one embodiment the local computing machine 204 and the remote computing machine 202 can be any computing device 100 described herein. In another embodiment, the local computing machine 204 can be a server 106 while the remote computing machine 202 can be a client 102. The local computing machine 204 can be referred to as any of the following: local computer; server; computer; computing device; machine; first computing device; second computing device; or any other similar phrase. The remote computing machine 202 can be referred to as any of the following: remote computer; client; computer; computing device; machine; first computing device; second computing device; or any other similar phrase. In some embodiments, the local computing machine 204 and the remote computing machine 202 communicate over a communication channel established over the network 104. Each computing machine can communicate with the other computing machine using a presentation level protocol. In some embodiments, this protocol can be the ICA protocol developed by CITRIX SYSTEMS INC.

Each of the local computing machine 204 and the remote computing machine 202 contain a: memory element 122, 122'; main processor 121, 121'; and a GPU 216, 216'. The memory element 122, 122' and the main processor 121, 121' can be any of the memory elements and processors described herein. The GPU (Graphical Processing Unit) can in some embodiments be a hardware component dedicated to processing graphics commands, while in other embodiments, the GPU can be a set of executable commands, or executable program able to process graphics commands. In some embodiments, the local computing machine 204 and the remote computing machine 202 may include a three-dimensional graphics library (not shown) that may be associated with Direct3D, OPEN GL or other three-dimensional graphics Application Program Interface (API). Embodiments where a graphics library is included may further include a GPU 216, 216' that interfaces with the graphics library to render graphics.

In one embodiment, the local computing machine 204 executes an application 208 that generates application output. The application output can comprise graphical data that is then displayed on a display device connected to the local computing machine 204. Users of the remote computing machine 204 can access the application output and control the application 208 via a remote delivery system 210 that captures the application output as it is generated by the application 208 and transmits the application output to the remote computing machine 202 where it is rendered for display on a screen of a display device connected to the remote computing machine 202. The application 208 can be any of the following: a desktop; a set of commands; an application executable on a device connected to the local computing machine 204; and any other application able to be executed by the local computing machine 204.

In one embodiment the local computing machine 204 can execute an application/desktop delivery system 210 that intercepts application output generated by the application 208 executing on the local computing machine 204 and transmits the application output to a remote computing device 202 where it is received by a client agent 214 executing on the remote computing device 202. The application/desktop delivery system 210 can transmit the intercepted application output over a communication channel that the application/desktop delivery system 210 establishes between the local computing machine 204 and the remote computing machine 202. Further, in some embodiments, the application/desktop delivery system 210 can transmit the intercepted application output using a presentation level protocol. In one embodiment, the application/desktop delivery system 210 receives user commands and other user-generated input from the client agent 214. Once the user commands are received by the application/desktop delivery system 210, they can be forwarded to the application 208 where they are processed.

In one embodiment, the remote computing machine 202 can execute a client agent 214 that receives graphics information and application output transmitted by the application/desktop delivery system 210 via a communication channel established between the local computing machine 204 and the remote computing machine 202 and over the network 104. Once the client agent 214 receives the graphics information and application output, the client agent 214 can, in some embodiments, send the graphics information to the GPU 216' for rendering and transmit additional information to a remote application presentation window 212 executing on the remote computing machine 202. In some embodiments, the client agent 214 can intercept user commands and other user-related data and send this data to the application/desktop delivery system 210 on the local computing machine 204. Once the data is rendered by the GPU, the resulting graphics can be displayed within the remote application presentation window 212 which can in some instances be configured to resemble the application 208 executing on the local computing machine 204.

Included on the local computing machine 204 is an encoder 222, while the remote computing machine 202 includes a decoder 226. In one embodiment, the encoder 222 can be a compressor while the decoder 226 can be a decompressor. The encoder 222 can take an image as input and encode the image to either compress, convert or encrypt the image and output an encoded data element or image. In contrast, the decoder 226 can take an encoded image as input and decode the image to either decompress, convert or decrypt the image and output a decoded data element or image. In one embodiment, the encoder 222 can encode images conditioned, generated or otherwise manipulated by the image partitioner 220, while the decoder 226 can decode image portions and transmit them to the combining agent 224 to be combined with other decoded image portions. Both the encoder 222 and the decoder 226 can be modules, agents or programs that execute on a computing machine. Each of the encoder 222 and the decoder 226 can encode or decode images using any encoding, compression or encryption algorithm.

In one embodiment, an image partitioner 220 executes on the local computing machine 204. Other embodiments include an image partitioner 220 that executes on a separate computing machine or device. The image partitioner 220 can accept images as input and further partition the images according to an encoding scheme determined by any combination of: application output; the parameters of an image, user input, client input, or system settings. Once the image partitioner 220 has partitioned each image into sub-images or image portions, the image partitioner 220 can then send each image portion to the encoder 222 which then encodes each image portion. The application/desktop delivery system 210 can then transmit the encoded image portions to a remote computing machine 202 or to another computing machine or device. In some embodiments, the encoder 222 is included in the image partitioner 220, while in other embodiments, the image partitioner 220 and/or the encoder 222 are included in the application/desktop delivery system 210.

In another embodiment, an combining agent 224 executes on the local computing machine 204. Other embodiments include an combining agent 224 that executes on a separate computing machine or device. The combining agent 224 can accept decoded image portions as input and further combine the image portions according to an encoding scheme dictated in part by either the received image portions, the client agent 214 or the local computing machine 204. Once the combining agent 224 receives the decoded image portions from the decoder 226 or from any other source able to provide decoded image portions, the combining agent 224 can combine the image portions to generate a full image. The generated image can then be displayed within the remote application presentation window 212 or elsewhere on the remote computing machine 202. In some embodiments, the decoded 226 is included in the combining agent 224, while in other embodiments, the combining agent 224 and/or the decoder 226 are included in the client agent 214.

Figure 3A:
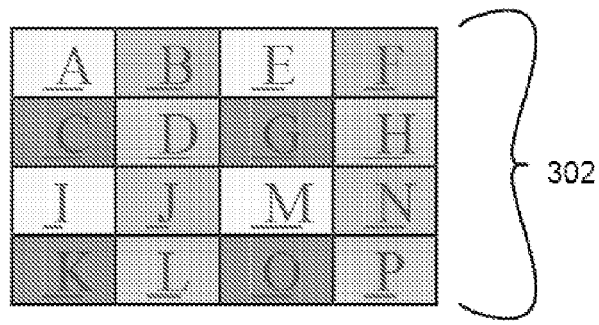
FIGS. 3A-3B are block diagrams illustrative of an embodiment images that have been partitioned according to the systems and methods described herein.
Figure 3B:
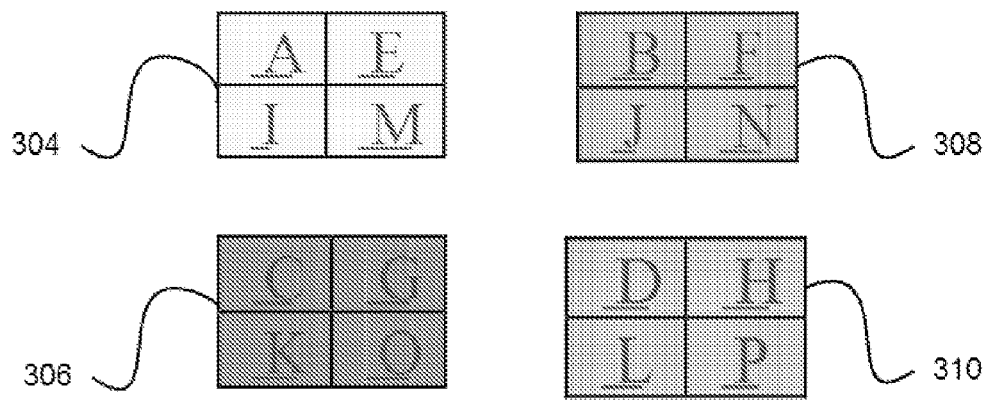

Illustrated in FIG. 3A is a representation of an image 302 where the pixels within the image are divided according to assigned fields. FIG. 3B illustrates each field 304, 306, 308, 310 separate from the interlaced image illustrated in FIG. 3A.

Further referring to FIGS. 3A and 3B and in more detail, illustrated is a graphical representation of an image partitioned or divided into fields. Each box included in the image 302 is representative of a pixel. Thus, the image 302 includes sixteen pixels labeled A, B, C, D, E, F, G, H, I, J, K, L, M, N, O and P. Although FIG. 3A illustrates an image vertically and horizontally divided into sixteen pixels, in other embodiment, each cell can represent multiple pixels. For example, the image 302 can be representative of an image 302 divided into four vertical columns and four vertical rows such that each cell in the resulting grid (e.g. there are sixteen cells of A through P), represents a group of one or more pixels. In some embodiments, each cell can include two pixels while in other embodiments each cell can include two or more pixels. A cell can therefore be a group or section of pixels that can include one or more pixels, and can be referred to as: an image portion; image block; sub-image; or group or collection of image pixels.

While this image 302 illustrates an encoding method that has four steps and therefore four fields, any number of fields or steps can be employed. For example, the image 302 also illustrates four fields: a first field 304 including pixels A, E, I and M; a second field 306 including pixels C, G, K and O; a third field 308 including pixels B, J, F and N; and a fourth field 310 including pixels D, L, H and P. The fields are interlaced with each other or interleaved such that a pixel in the first field 304 (M) is surrounded by pixels in the second field 306 (G, O), pixels in the third field 308 (J, N), and all four of the pixels in the fourth field 310, yet M is not surrounded by any other pixels from the first field 304. In other embodiments, a field can include any number of horizontal rows of pixels, and any number of vertical columns of pixels. Thus, a field can include two vertical columns and three horizontal rows, while another field can include three vertical columns and two horizontal rows, while still another field can include one horizontal row and one vertical column.

In some embodiments, the fields of an image can be arbitrarily chosen such that the fields do not overlap one another. In some embodiments, a field can include two vertical columns and two horizontal rows. In other embodiments a field can include three vertical columns and three horizontal rows. A field, in other embodiments, can include any number of vertical rows and any number of horizontal rows. The cells included in a field may include any number of pixels. Thus, in some embodiments, an image that is four pixels wide and four pixels long may have four fields where each cell has a single pixel, while an image that is eight pixels wide and eight pixels long can also have four fields, but each cell includes four pixels.

Figure 4:
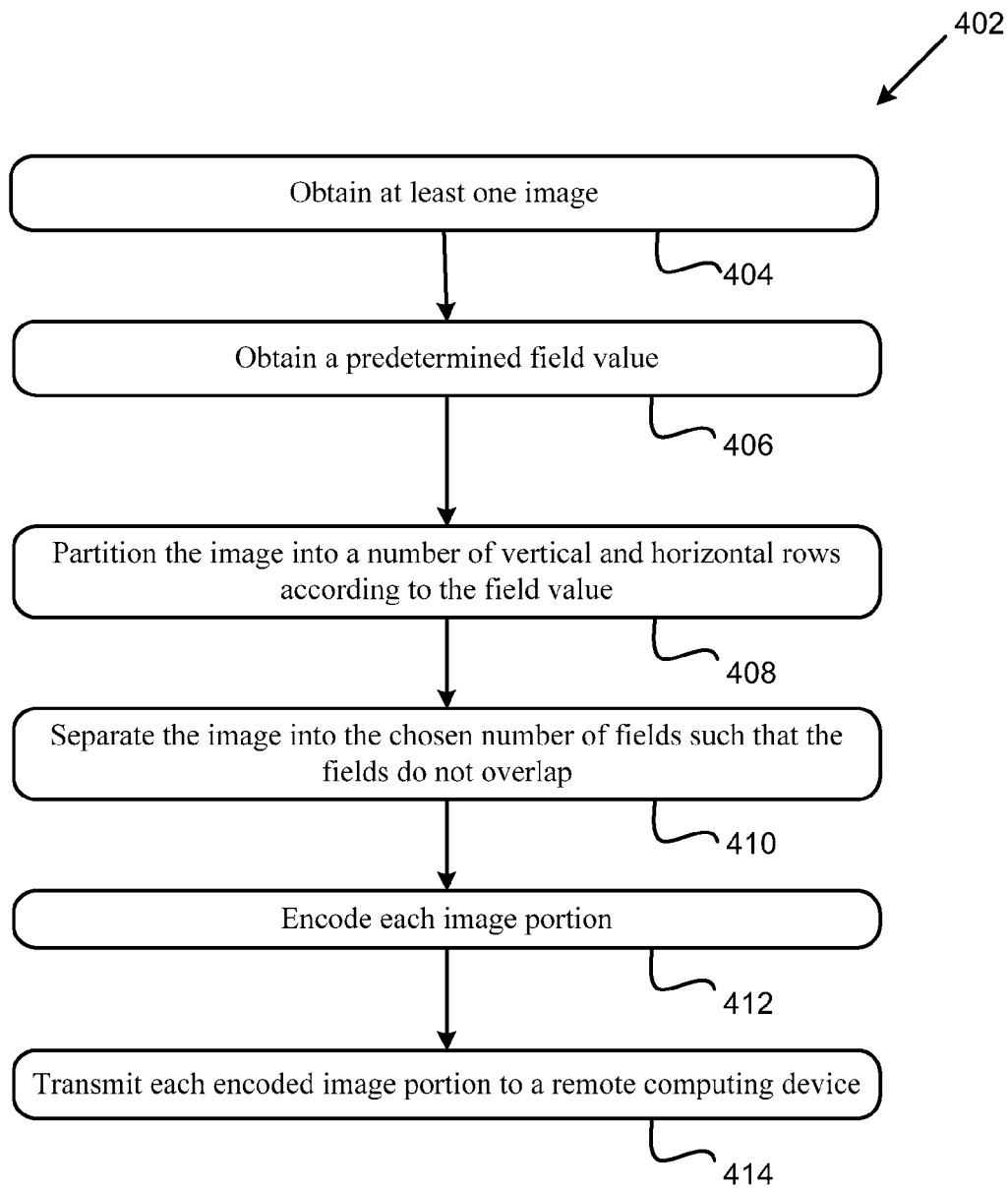
FIG. 4 is a flow diagram illustrative of an embodiment of a method for partitioning an image prior to encoding.

Illustrated in FIG. 4 is a flowchart depicting an embodiment of a method 402 for partitioning an image into image portions much the same way as the image 302 illustrated in FIG. 3A is partitioned into image portions or cells 304, 306, 308 and 310 as illustrated in FIG. 3B. An image partitioner 220 executing on a local computing machine 204 or on any other computing machine or appliance in communication with a local computing machine 204, obtains at least one image (Step 404) and obtains a predetermined field value (Step 406). The image partitioner 220 then partitions or divides the image into the chosen number of vertical and horizontal rows according to the field value (Step 408). The image partitioner 220 then separates the image into sub-images according to the obtained field such that the fields do not overlap (Step 410). Each image portion is then encoded by an encoder 222 (Step 412) and the encoded image portion is transmitted to a remote computing device 202 (Step 414).

Further referring to FIG. 4 and in more detail, the image partitioner 220 obtains at least one image from an image source (Step 404). In some embodiments, the image source can be an application 208 executing on the local computer 204, in another embodiment the image source can be a memory element 122 on the local computer 204 that stores images. In still other embodiments, the image partitioner 220 can obtain the image from the GPU 216, where the GPU 216 generates the image from image commands and images transmitted to the GPU 216 by applications 208 executing on the local computer 204. In one embodiment, the image partitioner 220 can obtain the image from a remote computer or a remote storage repository.

In one embodiment, the image partitioner 220 can obtain an original image from an image source (Step 404). The image can be of any dimension and can include any number of pixels. In many embodiments, the image can be an un-divided, un-partitioned, original image.

Upon obtaining the original image, the image partitioner 220 can then obtain a predetermined field value (Step 406). A field value, in some embodiments, can represent the number of steps in an encoding scheme used to partition the original image. The field value can also be a representation of the number of horizontal rows and the number of vertical rows an image should be partitioned into. In still other embodiments, the field value can be a number representative of the number of fields, sub-images, or image portions the original image should be divided into. Thus, in many embodiments, there can be a relationship between the number of vertical and horizontal rows and the number of steps to be performed during image combination. For example, when the image is divided into two vertical fields and two horizontal fields, there are four steps. But when the image is divided into to vertical fields and three horizontal fields, there are six steps. Thus, the number of steps can be substantially equal to the number of horizontal fields multiplied by the number of vertical fields. In one example, if a user selects or identifies that the encoding scheme should have four steps, then based on the relationship between the number of steps and the number of horizontal and vertical rows, the image may be divided into two vertical and two horizontal rows. When the image partitioner 220 obtains the field value (Step 406), the image partitioner 220 can use the field value to determine a number of horizontal rows and a number of vertical rows or columns.

In some embodiments, the image partitioner 220 can obtain the field value from a storage repository on the local computer 204, a remote storage repository, the encoder 222, or from another application executing on the local computer 204. In other embodiments, the image partitioner 220 can obtain the field value from user input transmitted from the remote computer 202 to the local computer 204. In still other embodiments, the image partitioner 220 can determine, intuit or otherwise deduce the field value based on an encoding scheme selected by a user. For example, a user can select an encoding scheme which is sent to the encoder 222. The image partitioner 220 can send a request or query to the encoder 222 that requests information about a user-selected encoding scheme. In return, the encoder 222 can transmit to the partitioner 220 a field value and other relevant information such as a number of vertical rows or columns, and a number of horizontal rows.

In other embodiments, the field value can be determined based on application output, or can be hard-coded into the image partitioner 220. In one embodiment, the field value or the number of horizontal rows and vertical rows for a particular user, application, client machine, delivery system version or image may be stored in a database. When the image partitioner 220 obtains the field value, the image partitioner 220 can obtain the field value from the database.

The field value, in some embodiments, can be based on any of the following factors: the number of steps to-be performed in the encoding scheme; a resolution of the original image; a desired resolution for the combined image created on the remote computer 202; a factor; a number of vertical and horizontal rows; or any other input selection from which the image partitioner 220 can determine how many vertical rows and how many horizontal rows the image will be divided into. A user, in some embodiments, can identify or otherwise configure the encoding scheme by transmitting to the encoder 222 any of the following configuration requirements: a predetermined number of steps to-be performed in the encoding scheme; a desired resolution for the combined image created on the remote computer; a factor; and a desired number of vertical and horizontal rows.

Once the number of horizontal and vertical rows are determined, the image partitioner 220 can divide or partition the image into the rows according to the chosen number of vertical and horizontal rows (Step 408). In one embodiment, sections of pixels are carved out of the image according to the number of rows chosen. For example, if the image partitioner 220 determines, based on the obtained field value, that there should be two horizontal rows and two vertical rows, then the image partitioner would carve out a 2×2 block of divided or partitioned pixels. Similarly, if the image partitioner 220 determines that there should be two horizontal rows and three vertical rows, then the image partitioner 220 would carve out a 2×3 block of divided or partitioned pixels. Each pixel within the block is assigned to a row such that the rows are interlaced as is shown in FIG. 3A. In some embodiments, the blocks of pixels can be carved out according to a desired resolution, where the resolution is the ratio of horizontal rows to vertical rows or vice versa. Thus, a 3×2 resolution would correspond to three horizontal rows and two vertical rows. In many embodiments, the image partitioner 220 can partition or divide the original image into a predetermined number of horizontal rows and a predetermined number of vertical columns based in part on the obtained field value. Using the field value, the image partitioner 220 can determine a number of horizontal rows and a number of vertical rows/columns, and can partition the original image according to those determined numbers.

The original, partitioned image can remain interlaced or interwoven until the image partitioner 220 separates the image according to the assigned fields and such that the fields do not overlap (Step 410). Thus, as displayed in FIGS. 3A and 3B, if there are four fields, then the four fields are separated into their distinct blocks, i.e. a first field 304, a second field 306, a third field 308 and a fourth field 310. Each field can correspond to some combination of horizontal rows and vertical rows. Using FIGS. 3A and 3B as an example, the first field 304 contains pixels located within the image where the first horizontal row intersects the first vertical row and the third vertical row, and where the third horizontal row intersects the first vertical row and the third vertical row. The second field 306, however, contains pixels located within the image where the second horizontal row intersects the first vertical row and the third vertical row, and where the fourth horizontal row intersects the first vertical row and the third vertical row. Still another field, the third field 308, include pixels that are located within the image where the first horizontal row intersects the second vertical row and the fourth vertical row, and where the second horizontal row intersects the second vertical row and the fourth vertical row. When describing the contents of each field, the number (e.g. first, second, third, fourth) and the position (e.g. horizontal, vertical) of a row is entirely dependent on the viewers position. In many embodiments, these characteristics, e.g. the number and position of the row, are determined by the image partitioner 220 according to a standard viewing configuration of the partitioner 220.

In one embodiment, the image partitioner 220 does not separate the image into fields, but rather transmits the pixels that correspond to a field. The local computer 204, the image partitioner 220, the application/desktop delivery system 210, or some other application executing on the local computer 204 can transmit pixels of a field to a remote computer 202. In some embodiments, the pixels of a field are first forwarded to an encoder 222 before they are transmitted to a remote computer 202. In other embodiments, the entire original image is transmitted to the encoder 222 along with a partitioning scheme. Upon receiving the image and the scheme, the encoder 222 can partition the image into fields and transmit each sub-image to the remote computer 202. In other embodiments, the image partitioner 220 can partition the image into sub-images according to the field value and the number of horizontal and vertical rows, and can transmit each sub-image to the remote computer 202.

In one embodiment, the encoder 222 receives each sub-image prior to transmitting the sub-image to the remote computer 202, and encodes, encrypts or compresses the sub-image before transmitting the sub-image to the remote computer 202 (Step 412). In other embodiments, the method 402 does not include a step of encoding each image portion. In these embodiments, the partitioned sub-images are transmitted directly to the remote computer 202 rather than being encoded by the encoder 222.

The local computer 204, in some embodiments, transmits each image portion or sub-image to the remote computer 202 (Step 414). The local computer 204 can transmit each image portion or sub-image after the image partitioner 220 partitions the original image, or as the image partitioner partitions the original image. In some embodiments, the local computer 204 can transmit each image portion after the encoder 222 encodes each image portion. While in some embodiments the local computer 204 transmits each sub-image to the remote computer 202, in other embodiments the image partitioner 220, the application/desktop delivery system 210, the encoder 222, or any other application executing on the local computer 204 can transmit the image portion or sub-image to the remote computer 202. In one embodiment, transmitting the sub-image to the remote computer 202 can include streaming to the sub-image to the remote computer 202. While FIG. 4 depicts a method 402 where each sub-image is transmitted to the remote computer 202, in other embodiments the local computer 204 can transmit the sub-image to a proxy computer or device, and the proxy computer or device can transmit the sub-image to the remote computer 202. In still other embodiments, the application/desktop delivery system 210 may store each encoded image portion in a buffer and transmit the encoded image portion only when the local computing machine 204 receives confirmation that the previous encoded image portion was transmitted.

Illustrated in FIGS. 5A-5D is an embodiment of image representing the progression of what a remote computer 202 receives when the image portions illustrated in FIG. 3B are transmitted to the remote computer 202 according to the systems and methods described herein.

Figures 5A, 5B, 5C, 5D:
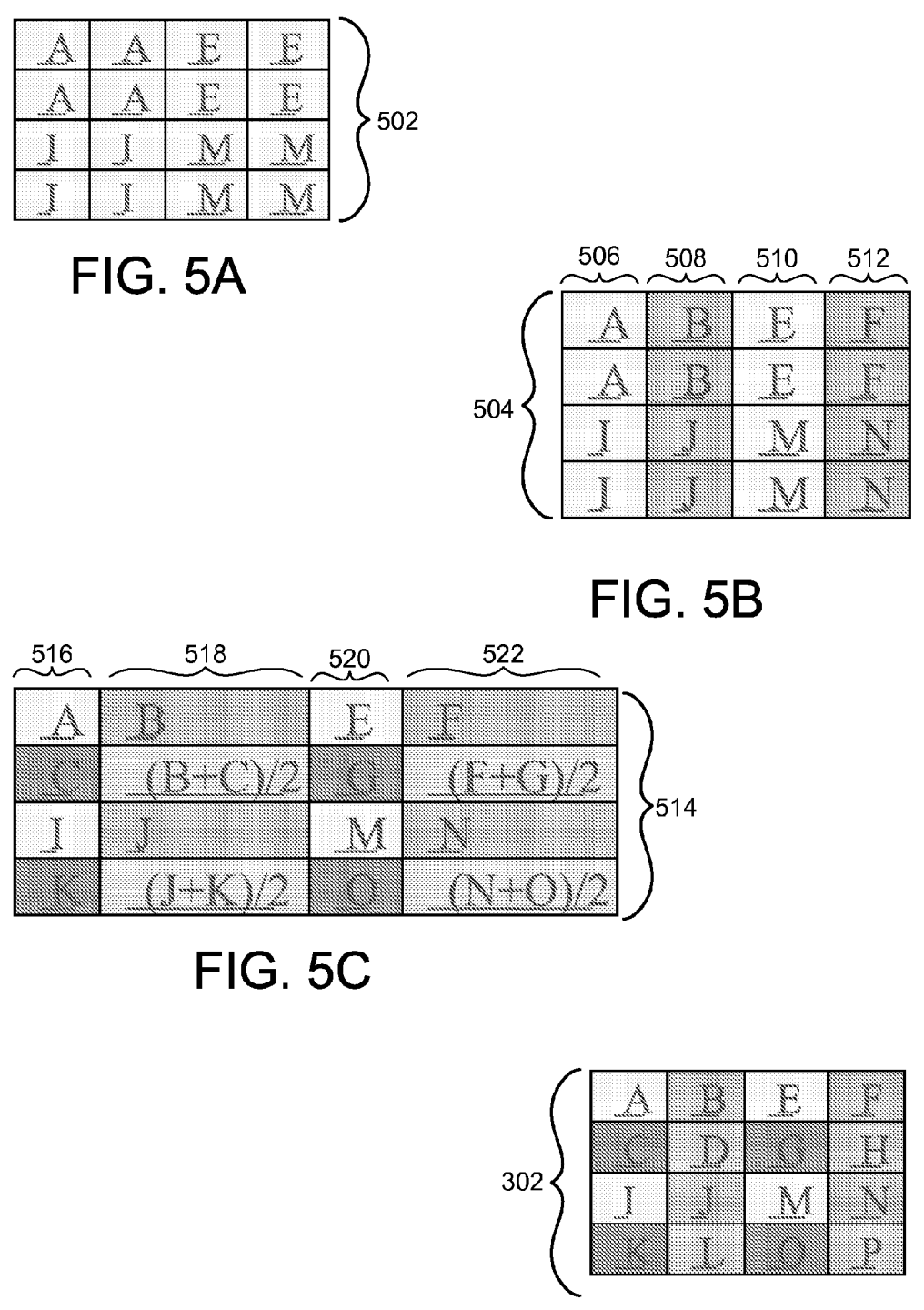

FIG. 5A illustrates a combined image 502 created by combining the sub-images received by the remote computer 202 from the local computer 204. The combined image 502 is created using the first field 304 pixels from the original image. In this embodiment, the additional pixels of the image 302 are interpolated or otherwise filled in by copying a pixel into nearby adjacent pixels. For example, the first field 304 contains pixels A, E, I, M, to account for the missing pixels (B, C, D, F, G, H, J, K, L, N, O, P.) In order to account for these pixels, a pixel from the first field 304 is copied into the spaces around that pixel. For example, in the original image 302, pixel A is surrounded by B, C, D. None of these pixels are included in the first field 304, therefore in the combined image those pixels are filled in with a copy of the A pixel.

FIG. 5B illustrates the image 504 which results from the remote computer 202 receiving both the image portion assigned to the first field 304 and the image portion assigned to the third field 308. Just as the fields were interwoven in FIG. 3A, the received first field 304 and third field 308 image blocks are interwoven so that there is a first column of pixels 506 corresponding to the first field 304, a second column of pixels 508 corresponding to the third field 308, a third column of pixels 510 corresponding to the first field 304 and a fourth column of pixels 512 corresponding to the third field 308. In the combined image 504, the following pixels are missing: C; D; G; H; K; L; 0; and P. To account for these missing pixels, FIG. 5B illustrates how each pixels is copied into an adjacent cell to fill out the holes left by the missing pixels. FIG. 5B is illustrative of one embodiment of interpolating the received pixels to fill in gaps left by pixels that have-not-yet been received.

FIG. 5C illustrates the image 514 which results from the remote computer 202 receiving the image portion assigned to the first field 304, the image portion assigned to the third field 306, and the image portion assigned to the second field 308. Just as the fields were interwoven in FIG. 3A, the received first field 304, second field 306 and third field 308 image blocks are interwoven so that there is a first column of pixels 516 and a third column of pixels 520 corresponding to the first field 304, where each row of pixels alternates between a pixel from the first field 304 and a pixel from the second field 306. The FIG. 514 further includes a second column of pixels 518 and a fourth column of pixels 522 corresponding to the third field 308, where each row of pixels alternates between a pixel from the third field 308 and a weighted average of the previous third field 308 pixel and the adjacent second field 306 pixel.

FIG. 5D illustrates the final image 302 that results once the remote computer 202 receives the image portion assigned to the first field 304, the image portion assigned to the second field 306, the image portion assigned to the third field 308 and the image portion assigned to the fourth field 310. Just as the fields are interwoven or interlaced in the beginning image, the fields are interwoven in the resultant image 302.

Further referring to FIGS. 5A-D, and in more detail, in one embodiment, during each step of the process, the combining agent 224 may interpolate a received image to expand the image and by proxy the received fields to the full resolution of the starting image 302. The effects of interpolation can be seen in FIG. 5A where the pixel A is repeated three times to create a block of four A pixels. Interpolating the pixel A so that it occupies an entire 2×2 block of pixels as opposed to a single pixel, causes the single first field 304 image block to expand to the full resolution of the starting image 302. The effects of interpolation can also be see in FIG. 5C where a number of pixels are filled using a weighted average of the surrounding pixels. For example, one pixel is filled using a weighted average of pixel B and pixel C, thus the value of this pixel is (B+C)/2. The interpolation used in FIGS. 5A-D is illustrative and other interpolation methods may be used. For example, in some embodiments, the pixel described above may have any of the following values: (B+C+J+G)/4; (J+G)/2; or any other interpolation scheme that produces the best image quality. In other embodiments, interpolation may not be used, but rather a neighboring pixel may be repeated. For example, the earlier described pixel may have any of the following values in lieu of a weighted average: C, G, B or J.

Figure 6:
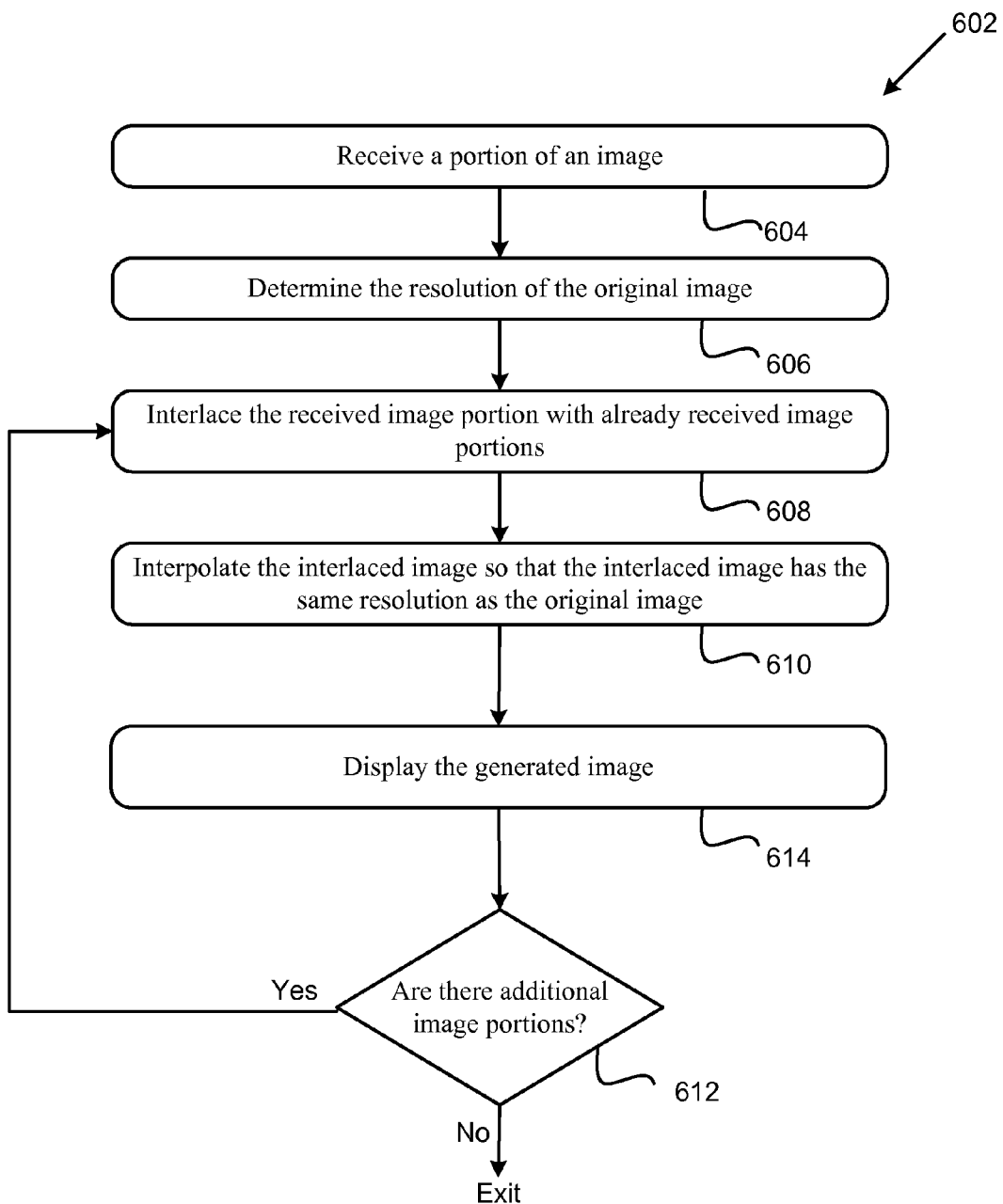
FIG. 6 is a flow diagram illustrative of an embodiment of a method for combining image partitions into an image.

Illustrated in FIG. 6 is an embodiment of a method 602 for combining image blocks or portions of images to generate an original image. The method 602 includes receiving, by an combining agent 224, a portion of an image (Step 604), and further determining by the combining agent 224 the resolution of the original image (Step 606). The combining agent 224 then interlaces the received image portion with already received image portions (Step 608) and interpolates the interlaced image so that the interlaced image has the same resolution as the original image (Step 610). Then the combining agent 224 displays the generated image (Step 614). After interpolation occurs, the combining agent 224 then determines whether additional image portions exist (Step 612). If additional image portions do exist, then the combining agent 224 repeats the process by receiving another portion of the image (Step 604).

Further referring to FIG. 6 and in more detail, the combining agent 224 can receive the portion of the image (Step 604) from any one of the following places: memory; an application executing on the remote computing device 202; the client agent 214; the decoder 226; directly from the local computing machine 204; or from any other source able to transmit a portion of an image to the combining agent 224. In one embodiment, the decoder 226 decodes the portion of the image once the image portion is received by the remote computing machine 202, and the decoder 226 sends the decoded image portion to the combining agent 224 for further processing. In another embodiment, the decoded 226 is included in the combining agent 224 such that when the combining agent 224 receives an encoded image portion, the combining agent 224 first decodes the encoded image portion using the decoder 226 and then processes the decoded image portion.

Once the combining agent 224 receives the image portion, the combining agent 224 then determines the resolution of the original image 302 (Step 606). In one embodiment, the resolution value is transmitted to the remote computing machine 202 along with the image portion as metadata. In another embodiment, the user can configure the remote computing machine 202 to default to a particular resolution, while in other embodiments, the client agent 214 queries the application/desktop delivery system 210 for a value representative of the image resolution value. The resolution value, in some embodiments, can be used to determine how many pixels are missing. For example if the first field 304 of FIG. 3B is received, the resolution of that sub-image is a 2×2 sub-image. The original image 302, however, is an image that has a resolution of 4×4. Using the original image's resolution, the combining agent 224 can determine that 12 pixels are missing and can use this information to determine how to build the combined image, e.g. the image 502 displayed in FIG. 5A.

Upon receiving the original image's resolution, the combining agent 224 then interlaces the received image portion with any image portions that have already been received by the combining agent 224 (Step 608). When the image portion received by the combining agent 224 is the first image portion and no other image portions have been received by the combining agent 224; the received image portion is not interlaced with additional image portions. In situations where more than one image portions have been received and interlaced prior to receiving the current image portion, the current image portion is interlaced with each of the previous image portions. In some instances, the image portions may not be interlaced. In other embodiments, the received image portion can be interlaced according to the field represented by the image portion and so that the each received field is evenly interlaced throughout the resulting image.

Once the combining agent 224 has interlaced the received image portion with any existing image portions, the combining agent 224 can then interpolate the resulting image so that the resultant, interlaced image has the same resolution as the original image (Step 610). In one embodiment, the combining agent 224 uses the determined resolution as the guide for how much to interpolate the resulting image. The combining agent 224, in one embodiment, can interpolate the interlaced image by using a weighted average of surrounding pixels. In some embodiments, the combining agent 224 can interpolate the interlaced image by copying nearby pixels into missing pixel locations.

Interpolating the pixels of the received fields to generate a combined image that approximates the original image 302 can include using any of the algorithms or methods described herein. Upon interpolating the received pixels, the remote computer 202 can display the combined image 614 on a display device (Step 614). While FIG. 6 illustrates a method 602 that displays the combined image 614, in other embodiments, the combined image can be stored in a storage repository.

The process 602 can be repeated until all image portions or sub-images are received. For example, the combining agent 224 can determine whether additional image portions or sub-images are in queue (Step 612) and can either re-start the process by interlacing additional received sub-images (Step 608), or can exit the process 602 when no additional images have been received. In some embodiments, the combining agent 224 can determine whether there are additional sub-images by querying a cache, buffer or other storage repository for additional sub-images. In other embodiments, the combining agent 224 can use the original image resolution to determine whether a combination of the sub-images received, before interpolation, creates an image having substantially the same resolution as the original image 302. When no interpolation is needed to create a combined image having substantially the same resolution as the original image 302, the method or process 602 may end.

The present disclosure may be provided as one or more computer-readable programs embodied on or in one or more articles of manufacture. The article of manufacture may be a floppy disk, a hard disk, a compact disc, a digital versatile disc, a flash memory card, a PROM, a RAM, a ROM, a computer readable medium having instructions executable by a processor, or a magnetic tape. In general, the computer-readable programs may be implemented in any programming language. Some examples of languages that can be used include C, C++, C#, or JAVA. The software programs may be stored on or in one or more articles of manufacture as object code.

While various embodiments of the methods and systems have been described, these embodiments are exemplary and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the exemplary embodiments and should be defined in accordance with the accompany claims and their equivalents.

The invention claimed is:

1. A method for processing approximated progressive images, the method comprising:
receiving, by an image processor, an encoding of a first sub-image for a first image, the first image partitioned into a plurality of non-overlapping image cells, each cell comprising one or more pixels, the cells forming a grid comprising horizontal rows of image cells and vertical columns of image cells, and the first image having been separated into a plurality of sub-images, each sub-image comprising image cells of two or more non-adjacent horizontal rows and two or more non-adjacent vertical columns, wherein the first sub-image is in the plurality of sub-images;
decoding, by the image processor, the encoding of the first sub-image;
receiving, by the image processor, an encoding of a second sub-image for the first image, wherein the second sub-image is in the plurality of sub-images;
decoding, by the image processor, the encoding of the second sub-image; and generating, by the image processor, an approximation of the first image by interlacing the first sub-image and the second sub-image, interpolating pixels not included in the first sub-image and the second sub-image, and using the interpolated pixels in generating the approximation of the first image.

2. The method of claim 1, wherein interpolating comprises using a weighted average of pixels.

3. The method of claim 1, wherein interpolating comprises repeating a neighboring pixel.

4. The method of claim 1, comprising receiving, by the image processor, an encoding of a third sub-image for the first image, wherein the third sub-image is in the plurality of sub-images; decoding the encoding of the third sub-image and generating an improved approximation of the first image using the decoded third sub-image.

5. The method of claim 1, wherein the image processor is in a mobile computing device.

6. The method of claim 1, wherein the image processor is in a mobile telephone.

7. The method of claim 1, comprising receiving, by the image processor, the encoding of the first sub-image via a wireless data network.

8. The method of claim 1, comprising displaying the approximation of the first image on an electronic display.

9. A system for processing approximated progressive images, the system comprising:
a transceiver configured to:
receive an encoding of a first sub-image for a first image, the first image partitioned into a plurality of non-overlapping image cells, each cell comprising one or more pixels, the cells forming a grid comprising horizontal rows of image cells and vertical columns of image cells, and the first image having been separated into a plurality of sub-images, each sub-image comprising image cells of two or more non-adjacent horizontal rows and two or more non-adjacent vertical columns, wherein the first sub-image is in the plurality of sub-images; and
receive an encoding of a second sub-image for the first image, wherein the second sub-image is in the plurality of sub-images; and
an image processor configured to:
decode the encoding of the first sub-image;
decode the encoding of the second sub-image; and
generate an approximation of the first image by: interlacing the first sub-image and the second sub-image, interpolating pixels not included in the first sub-image and the second sub-image, and using the interpolated pixels in generating the approximation of the first image.

10. The system of claim 9, wherein the image processor is configured to interpolate a pixel using a weighted average of pixels.

11. The system of claim 9, wherein the image processor is configured to interpolate a pixel by repeating a neighboring pixel.

12. The system of claim 9, wherein the transceiver receives an encoding of a third sub-image for the first image, wherein the third sub-image is in the plurality of sub-images; and the image processor decodes the encoding of the third sub-image and generates an improved approximation of the first image using the decoded third sub-image.

13. The system of claim 9, wherein the transceiver is in a mobile computing device.

14. The system of claim 9, wherein the transceiver is in a mobile telephone.

15. The system of claim 9, wherein the transceiver is configured to receive the encoding of the first sub-image via a wireless data network.

16. The system of claim 9, comprising an electronic display displaying the approximation of the first image.

17. The method of claim 1, wherein decoding, by the image processor, the encoding of the first sub-image comprises decrypting the encoding of the first sub-image for the first image; and decoding, by the image processor, the encoding of the second sub-image comprises decrypting the encoding of the second sub-image for the first image.

18. The method of claim 1, wherein decoding, by the image processor, the encoding of the first sub-image comprises decompressing the encoding of the first sub-image for the first image; and decoding, by the image processor, the encoding of the second sub-image comprises decompressing the encoding of the second sub-image for the first image.

19. The system of claim 9, wherein the image processor is configured to decrypt the encoding of the first sub-image for the first image, and to decrypt the encoding of the second sub-image for the first image.

20. The system of claim 9, wherein the image processor is configured to decompress the encoding of the first sub-image for the first image, and to decompress the encoding of the second sub-image for the first image.

* * * * *